July 19, 1955  C. E. WALTON  2,713,258

HYDROMETERS OR BEVERAGE TESTERS

Filed Sept. 15, 1949

INVENTOR.
CHARLES EMMET WALTON
BY *H. M. Kilpatrick*
ATTORNEY 2,713,258

HYDROMETER OR BEVERAGE TESTERS

Charles Emmet Walton, New York, N. Y.

Application September 15, 1949, Serial No. 115,830

5 Claims. (Cl. 73—33)

The herein described invention relates to instruments or testers of the hydrometer type for determining the specific gravities of liquids, with particular reference to spirituous liquors, though it is noted that the claims are not limited to testing liquors.

One of the objects of my invention is the provision of a novel compact simple durable floating tester or hydrometer, which may be inserted in the liquid to be measured and which without any adjustment will accurately indicate the specific gravity of the liquid.

Hydrometers of the floating type for determining the specific gravities, especially of liquids and thence the strength of spirituous liquors, saline solutions and the like have been in use for many years. Such instruments as more generally used have their stems graduated so as to indicate specific gravities directly or to indicate percentages of some constituent, or to indicate degrees on some arbitrary scale convertible into specific gravity. Such hydrometers designed for special uses are known as alcoholometers, salinometers, etc. Instruments of this type available on the market are in one piece and made of glass and consequently fragile. While satisfactory for stationary use, they are cumbersome to carry about and easily breakable. It may be noted that the United States Internal Revenue type graduated in Percentage of Proof Scale 0–100 (percent of alcohol by weight) has a nominal length of 12 inches and body diameter of approx. 1 inch. What is desirable especially at the present time, with the high cost of spirituous liquors and the tendency to dispense drinks with less than the customary alcoholic content, is a compact durable non-fragile instrument of commercial accuracy which can be easily transported and which will even be so small as to be readily carried in one's pocket or handbag. The materials and type of construction used up to the present in the manufacture of this type of instrument do not permit the making of an instrument embodying the desirable features above mentioned.

Objects of the present invention are to provide a hydrometer incorporating all the above named desirable features and which without any adjustment will indicate with commercial accuracy the specific gravity of a spirituous liquor when inserted in the liquid to be measured.

My improved hydrometer presents the following distinctive features: a novel type of indicator which permits the reduction in overall length of the instrument; a unique design of the body or float and manner of attaching the indicator to same; these details in combination with the materials used permit the provision of an instrument which is compact, simple, durable and nonfragile, which features have not been heretofore obtained, to my knowledge, on any similar instrument.

Additional objects of the invention are to effect simplicity and efficiency in such testers and to provide an extremely simple tester of this kind which is very compact for carrying, durable and reliable in use, and economical to manufacture.

Still other objects of the invention will appear as the description proceeds; and while herein details of the invention are described in the specification and some of the claims, the invention as described in the broader claims is not limited to these, and many and various changes may be made without departing from the scope of the invention as claimed in the broader claims.

The inventive features for the accomplishment of these and other objects are shown herein in connection with a beverage tester or hydrometer which briefly stated, includes a float body having a ballast at its lower part, at the upper end of which body is movably carried an elongated indicator pointed in a direction away from the ballast, said indicator being movable to allow the ends thereof to be disposed near said parts respectively thereby to reduce the overall length of the tester.

I provide a suitable compact transparent telescoping graduate container, which may be extended to receive the extended tester and the liquid to be tested, and may be telescoped for carrying therein the telescoped tester.

A small case is provided for carrying the telescoped or collapsed container with the telescoped tester therein.

In the accompanying drawing showing, by way of example, one of many possible embodiments of the invention, Fig. 1 is a side elevation showing the tester in liquid in the telescopic container;

Figure 1:
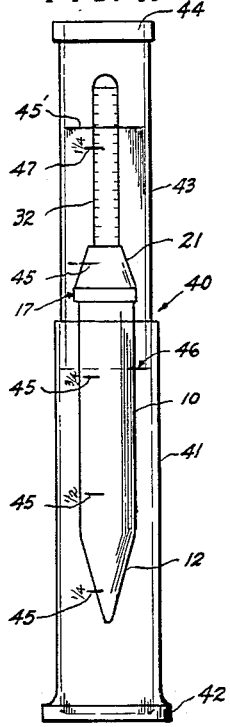

My improved tester or hydrometer as shown in Figs. 1 to 4 comprises an elongated tubular float body 10 disposable upright in a liquid and having external threads 11 at the upper end and a downwardly pointed conical lower end 12 carrying a ballast 15 secured in said lower end. The ballast 15 may be fine lead shot 15 or other metal held securely in place with marine varnish 16 or other adherent insoluble in water or alcohol. A cap 17 of silver or other suitable metal or material on the upper end of the body comprises a shallow lower internally threaded side wall 19 received on the threads of the body, an upwardly open pointed frusto-conical shell 21 joining the upper part of the side wall, a transverse partition 22 joining the lower part of the shell and having a central opening 23 of smaller diameter than said body, and a retaining ring 24 of silver or other material soldered or otherwise secured in the open upper end of the shell and having an inner diameter equal to the diameter of said central opening. A circular washer 25 is compressed between the upper edge face of the body and said partition wall to prevent entry of liquid between the cap and body into the body and has a central opening 26 about the size of the partition opening 23.

An elongated transparent plastic indicator tube 32 of smaller diameter than the body, closed at both ends, is telescopically received in said openings 23 and 26 and ring 24 with an easy sliding fit and contains a graduated paper tube 33 substantially filling the indicator tube and provided with a calibrated printed percentage of proof scale 34 thereon, the two tubes constituting an indicator. Instead of the graduations on the paper tube, the graduations may be directly applied to plastic indicator tube. A packing 35 is compressed in said shell between said partition, ring, shell and indicator tube, for preventing the entry of liquid through the cap into the float body, and is adapted to cooperate with the ring and partition to guide the indicator with a yieldable easy sliding friction fit and to releasably hold the indicator in any position of adjustment and allow the indicator to be telescoped within the body to reduce the overall length of tester approximately to the length of the body and cap alone.

A metal ring 36 cemented around the lower end of the indicator is adapted to engage the washer to limit outward movement of the indicator.

The operation of the tester of Fig. 1 is obvious from the foregoing. When it is desired to carry or store the tester, the indicator tube 32 is merely manually pushed or telescoped into the position shown in Fig. 2. When the tester is to be used, the indicator 32 is pulled out until the band 36 strikes the washer 25, in which condition the tester is ready to be immersed in the liquid in any suitable container or in the container 40 as shown in Fig. 1 whereupon the reading at the liquid level is read off in the usual manner.

Figure 2:
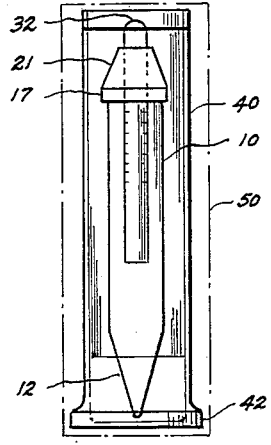
Fig. 2 is a side elevation of the collapsed tester in the collapsed container stored in a carrying case.
Figure 3:
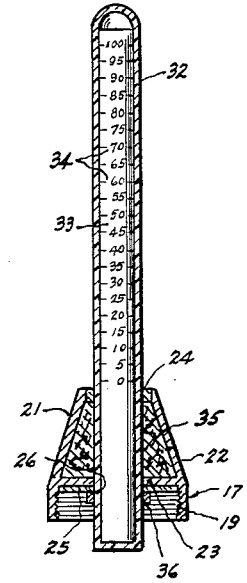
Fig. 3 is an axial sectional view partly in elevation drawn to a larger scale, showing the indicator and cap of the tester of Figs. 1 and 2.
Figure 4:
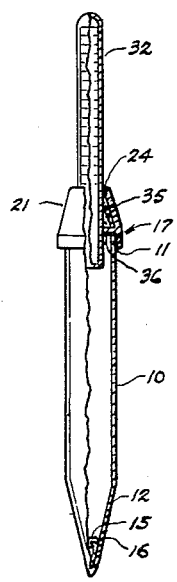
Fig. 4 is a side elevation, partly in section of the tester of Figs. 1 to 3.

The tester of Figs. 1 to 4 is adapted to be used in and carried in a self-supporting telescoping graduated container 40 as shown in Figs. 1 and 2 made of plastic or other suitable material preferably transparent and comprising a transparent supporting lower section 41 having a base 42, and a transparent upper inner tubular section 43 slidably telescopically fitting liquid tight in the lower section and provided with an upper edge rim 44 adapted to engage with the upper edge of the lower section when the upper section is moved inwardly nearly to said base. Said container when elongated as in Fig. 1 is adapted to receive a liquid 45' having floating therein any tester herein. However, the tester of Figs. 1 to 4 is particularly suitable to be used with the container as the indicator tube may telescope within the body, to allow the tester to be contained in the container when the upper section is fully telescoped within the lower section.

The container as drawn out to its limit, is graduated with marks 45, 46, 47 indicating fourths of a fluid ounce, one of said marks, the mark 47, which could be marked in red being also a limit indicator mark above which the extended container should not be filled to prevent overflow when the tester is inserted.

Another of said marks, the mark 46, is provided near the upper end of the lower section and serves as a limit mark with which the lower edge of the upper section may register when the upper section is outwardly drawn to its extended limit, to provide the proper volume to receive the liquid to be tested.

Said container when telescoped or collapsed with the collapsed or telescoped tester therein is adapted to be snugly received in a carrying case, indicated by the dotted lines 50, only very slightly longer and wider than the collapsed container.

While this instrument may be made in any practicable size, a practically accurate pocket instrument may have the following approximate dimensions: overall length with indicator retracted or detached 3⅜ inches; overall length with indicator extended or attached 4¾ inches; diameter of body 7/16 of an inch; diameter of indicator 5/16 of an inch.

The materials which have proved satisfactory are: plastic body and indicator with silver or other metal cap. However for special applications, the instrument may be made entirely of plastics, glass or metal or a combination of these.

Said container, graduated in fluid ounces, may be of approximately ¾ inch inside diameter and approximately 6 inches high in the extended position, since, for instance, for testing whisky served for a single highball in a bar, where there may not be available a container of suitable dimensions to permit the operation of the instrument due to the small quantity of whisky involved. It may be noted that this container with one fluid ounce of liquid, the smallest amount of spirits served by any bar for one drink, will permit the instrument to operate through its entire scale. The container and tester therein may be carried in the carrying case, the complete package for carrying measuring approximately 3½ x 1 x 1 inches.

When the graduate container is in the position of Fig. 2 and is to be operated, rim 44 is grasped, and the upper section 43 is drawn out until its lower edge registers with the mark 46. Then the liquid to be tested is poured into the container until it reaches near and not higher than the level of the mark 47. The tester is drawn out and then lowered into the liquid and allowed to come to rest, after which the graduation at the liquid level may be read.

When it is desired to store or carry the tester and container, they are both telescoped inwardly to the position of Fig. 2, the tester is placed into the telescoped container and the container with tester therein is placed in a carrying case just large enough to receive it as shown by the dotted lines 50 of Fig. 2.

I claim as my invention:

1. A tester comprising an elongated tubular float body having a ballast secured at its lower end; a cap secured on the upper end of the body and having an axial cylindrical opening therein; an elongated indicator slidably received in said opening with an easy friction fit; said indicator being adapted to telescope within the body thereby to reduce the over-all length of tester.

2. A tester comprising, in combination, an elongated tubular float body having a ballast secured at its lower end; a cap secured on the upper end of the body and comprising a shell having upper and lower axial openings therethrough; an elongated transparent tubular plastic indicator of smaller diameter than the body, closed at both ends, and telescopically received in said openings with an easy sliding fit; a paper tube substantially filling the indicator tube and provided with a calibrated scale thereon; a packing in said shell between said shell and indicator, for preventing the entry of liquid through the cap into the float body, and to cooperate with the ring and partition to hold the indicator with a yieldable easy sliding friction fit; a metal ring cemented around the lower end of the indicator to limit outward movement of the indicator; said cap and packing being adapted to yieldably allow the indicator to be telescoped within the body to reduce the over-all length of tester approximately to the length of the body and cap alone.

3. A tester comprising, in combination, an elongated tubular float body disposable upright in a liquid and having external threads at the upper end and a downwardly pointed conical lower end; a ballast secured in said lower end; a cap on the upper end of the body comprising a shallow lower internally threaded side wall received on the threads of the body, an upwardly open pointed frusto-conical shell joining the upper part of the side wall, a transverse partition joining the lower part of the shell and having a central opening of smaller diameter than said body, and a metal packing retaining ring secured in the open upper end of the shell and having an inner diameter equal to the diameter of said central opening; a circuit washer compressed between the upper edge face of the body and said partition wall to prevent entry of liquid between the cap and body into the body and having a central opening about the size of the partition opening; an elongated indicator tube telescopically received in said openings and ring; a packing in said shell and engaging the tube with an easy friction fit; said tube telescoping within the body thereby to reduce the over-all length of tester to the length of body and cap alone.

4. In combination, a telescoping graduate container comprising a supporting lower section having a base; and an upper inner section slidably telescopically fitting liquid-tight in the lower section and adapted to be drawn out to form a long container and provided with an upper edge rim adapted to engage with the upper edge of the lower section when the upper section is moved inwardly nearly to said base; said container being adapted to receive a hydrometer in said container comprising an elongated float body weighted at the lower end and an indicator tube adapted to telescope within the body to allow the hydrometer to be contained in the container when the upper section is fully inwardly telescoped; said upper section being provided with a limit mark adapted to register with the upper edge of the lower section when the upper section is outwardly drawn to provide enough space to receive enough liquid to be tested with said hydrometer when drawn out; the container as thus drawn out to said limit mark having an indicator mark to which the container should be filled to have the proper amount of liquid to be tested when said hydrometer is inserted for testing with the indicator tube drawn out.

5. In combination, a telescoping graduate container comprising a supporting lower section having a base; and an upper inner section slidably telescopically fitting liquid-tight in the lower section and adapted to be drawn out to form a long container and provided with an upper edge rim adapted to engage with the upper edge of the lower section when the upper section is moved inwardly nearly to said base; and a hydrometer adapted to be contained in said container comprising an elongated float body weighted at the lower end and an indicator tube adapted to telescope within the body to allow the hydrometer to be contained in the container when the upper section is fully inwardly telescoped; said upper section being provided with a limit mark adapted to register with the upper edge of the lower section when the upper section is outwardly drawn to provide enough space to receive enough liquid to be tested with said hydrometer when drawn out; the container as thus drawn out to said limit mark having an indicator mark to which the container should be filled to have the proper amount of liquid to be tested when said hydrometer is inserted for testing with the indicator tube drawn out.

References Cited in the file of this patent

UNITED STATES PATENTS

| Number | Name | Date |
|---|---|---|
| 31,100 | Adams | Jan. 15, 1861 |
| 1,579,652 | Detwiler | Apr. 6, 1926 |
| 1,921,786 | Burden | Aug. 8, 1933 |
| 1,964,145 | Edelmann | June 26, 1934 |
| 1,971,610 | Hayward | Aug. 28, 1934 |
| 2,221,913 | Edelmann | Nov. 19, 1940 |
| 2,267,115 | Linebarger | Dec. 23, 1941 |
| 2,312,106 | Longacre | Feb. 23, 1943 |